United States Patent [19]

Roberts

[11] Patent Number: 5,274,950
[45] Date of Patent: Jan. 4, 1994

[54] VERMIN BARRIER

[76] Inventor: Ernest H. Roberts, 2200 N. Ridge Rd. E., Elyria, Ohio 44035

[21] Appl. No.: 907,144

[22] Filed: Jul. 1, 1992

[51] Int. Cl.$^5$ ............................................. A01M 1/20
[52] U.S. Cl. ........................................ 43/121; 43/131
[58] Field of Search ............... 43/114, 108, 107, 121, 43/131, 132.1; 47/33; 52/102

[56] References Cited

U.S. PATENT DOCUMENTS

| 1,579,534 | 4/1926 | Hibbard et al. | 43/108 |
| 2,720,051 | 10/1955 | Line | 43/131 |
| 4,048,747 | 9/1977 | Shanahan et al. | 43/114 |

FOREIGN PATENT DOCUMENTS

| 6624 | 8/1879 | Fed. Rep. of Germany | 43/108 |
| 467007 | 2/1969 | Switzerland | 47/33 |
| 2146882 | 5/1985 | United Kingdom | 47/33 |

Primary Examiner—Paula A. Bradley
Assistant Examiner—Jeanne M. Elpel
Attorney, Agent, or Firm—Fay, Sharpe, Beall, Fagan, Minnich & McKee

[57] ABSTRACT

A vermin barrier comprises a vertically extending support member having a substantially planar exterior surface adapted for receipt adjacent a parallel surface. A shield member extends from the planar member such that the shield member and the planar member together define an interior region. A pesticide is disposed within said interior region such that a route of travel barrier and vapor head are created for deterring vermin from entering the interior region.

24 Claims, 3 Drawing Sheets

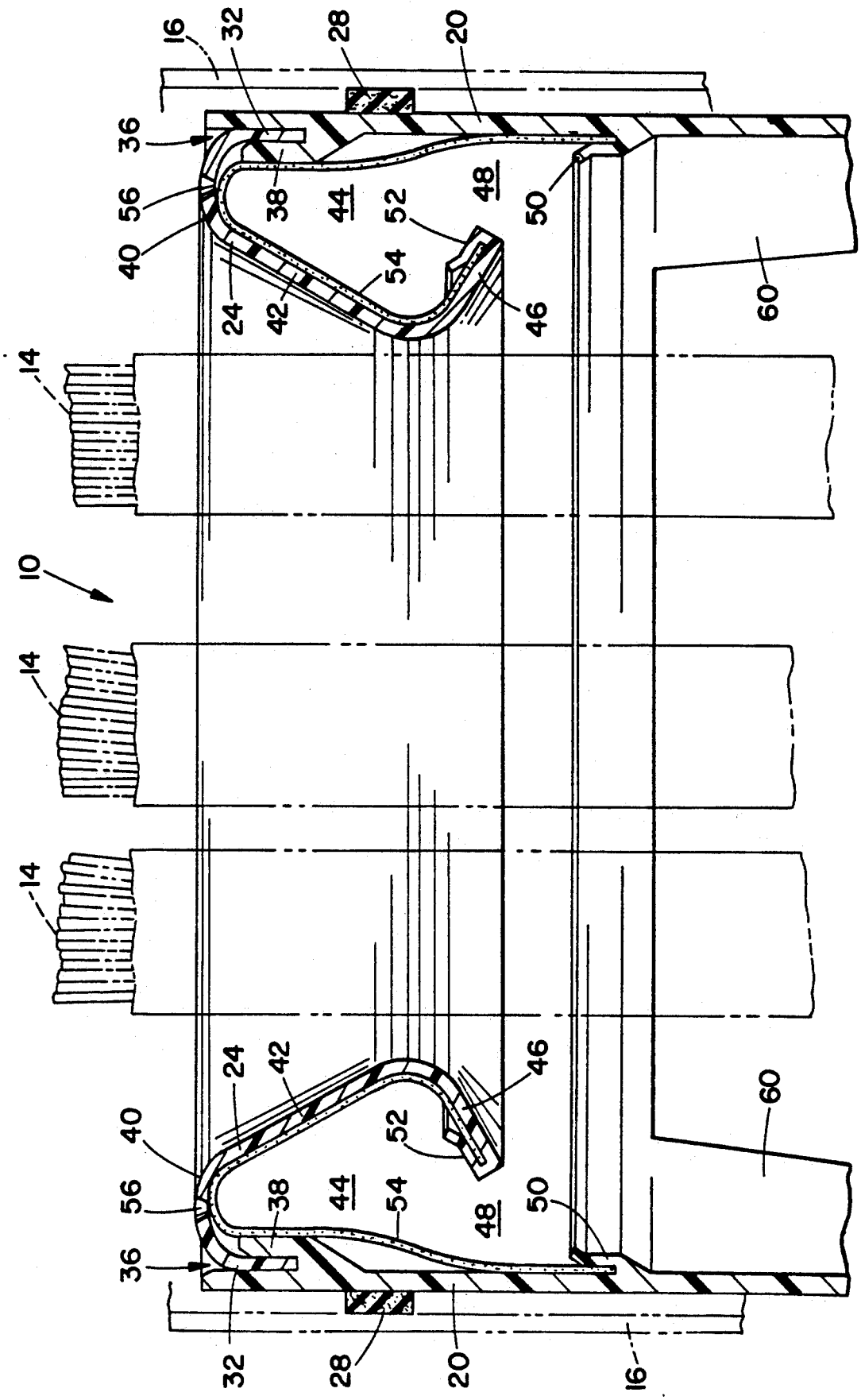

VERMIN BARRIER

BACKGROUND ON THE INVENTION

This invention pertains to the art of controlling a route of travel of crawling pests or vermin such as arthropods and rodents. It finds significant usefulness in controlling the route of travel of pests including mice, rats, chipmunks, squirrels, cockroaches, spiders and ants, including red imported fire ants.

The invention is particularly applicable to the control or repellency of vermin crawling along vertically situated surfaces and will be described with reference thereto. It will be appreciated, however, that the invention has broader application, such as in connection with preventing crawling vermin from passing along non-vertical surfaces. The invention may also be advantageously employed in other environments and applications.

Arthropod pests including roaches, spiders and ants are attracted to electrical and electromagnetic fields. They are known to invade the inner workings of telephone cable boxes, televisions, computers, traffic control apparatus, microwaves and other equipment. They often find their way into electrical equipment housings and nest in these dark spaces. This leads to a buildup of excrement, arthropod carcasses, webs and other items such as dirt and sand particles brought in by these pests (e.g. during colonization). Eventually, the presence of these undesirable elements causes primary electrical systems to short out and fail. Also, repair of electrical equipment requires removal of the undesirable material and often leads to bites or stings by the unwelcome vermin residing in the housing.

Underground telephone cable access housings are situated on the ground, or partially below the surface of the earth. These housings are easily and often invaded by spiders, ants, roaches and other pests which find access to the interior region of the housing by burrowing through the ground. The low level electrical fields within the housing attract the arthropods.

In addition to being attracted to electrical fields, cockroaches specifically find the dark area inside the housing a harborage, and take up residence therein. They subsist on, among other things, arthropod carcasses. Once the arthropods die, their corpses produce an ammonia gas which oxidizes and damages telephone wires and diminishes the decibel level on the phone lines. Spiders also form webs in the housings. The webs absorb moisture which causes shorts across electrical circuitry.

Another particularly undesirable creature to inhabit the electrical fields and, in particular, telephone cable access housings is the Red Imported Fire Ant (RIFA). Over the years, these red fire ants have become a problem and pose a health hazard in warm climates and are rapidly spreading with alarm. As with other pests, the fire ants are likewise attracted to electrical fields and as such are often found in electrical equipment. They often pack themselves around relays and connectors, causing serious damage to the equipment and the surrounding environment. The presence of such ants in electrical equipment creates a health hazard for persons working in the immediate area and often causes electrical shorts and corrosion.

In addition, farrow ants and fire ants have been known to crawl up vertical structures, such as table legs and the like, and have become a severe threat in hospitals, nursing homes and even in research laboratories which house research animals in cages on tables. The ants are able to approach and bite a human or animal, thus causing serious allergic reaction as well as spreading infection and disease. In many instances, this can be dangerous to the comfort and health of all involved by creating unsanitary and offensive work environments and causing job loss, labor delays, and loss of productivity to workers and industry.

It would be desirable to develop an environmentally safe device for eliminating arthropod pests from gaining access to electrical equipment or in areas where they create a nuisance or do not belong. The device should act as a deterrent, sending the undesirable crawling pests back into the ground or to the place from which they emanate.

The present invention contemplates a new and improved vermin barrier which overcomes all of the above referenced problems and others and provides a means for control against crawling vermin which is simple to use, economical to manufacture, efficacious and environmentally safe.

BRIEF DESCRIPTION OF THE INVENTION

In accordance with the present invention, there is provided a barrier to control the passage of crawling vermin.

In accordance with the more limited aspect of the invention, a vermin barrier comprises a vertically extending support member having a substantially planar exterior surface adapted for receipt adjacent a parallel surface. A shield member extends from the planar member such that the shield member and the planar member together define an interior region. A pesticide is disposed within said interior region such that a vapor head is intentionally created for deterring vermin from entering the interior region. The shield member and support member are situated such that their unique arrangement allows for the intentional creation of a vermin deterring vapor head by the presence of pesticide within the interior region.

A principal advantage of the invention is that it safely disrupts the route of travel of rodents and arthropod pests and prevents them from accessing an area where their presence is undesirable.

Another advantage of the present invention is that it is efficacious, environmentally safe, and disposable materials to which active pesticide ingredients are applied are biodegradable.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof.

FIG. 3 is a cross sectional view of the vermin barrier with its environment shown in phantom.

DETAILED DESCRIPTION OF THE PREFERRED EMBODIMENT

Figure 2:
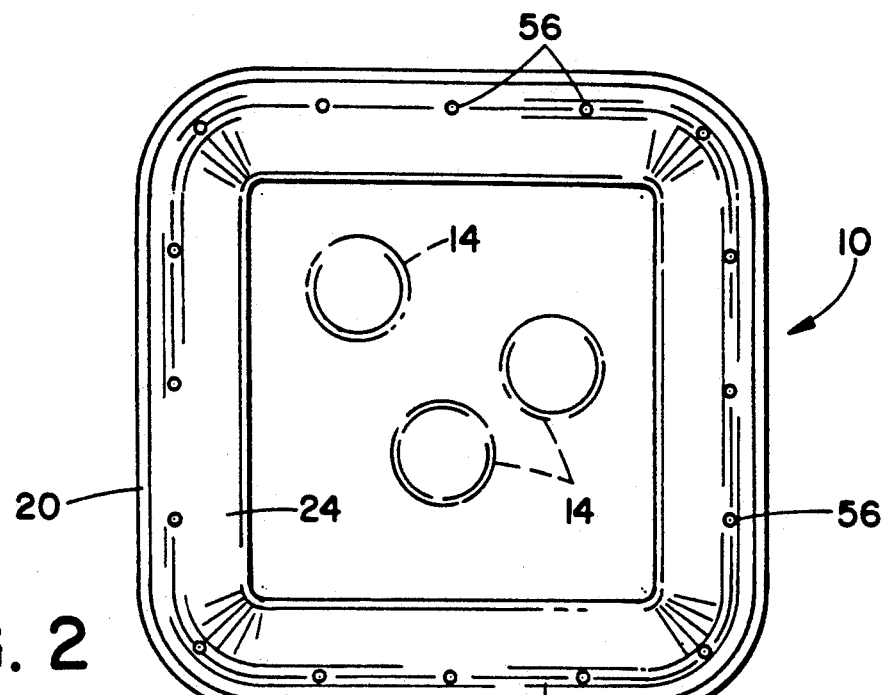
FIG. 2 is a plan view of a vermin barrier of the present invention.
Figure 1:
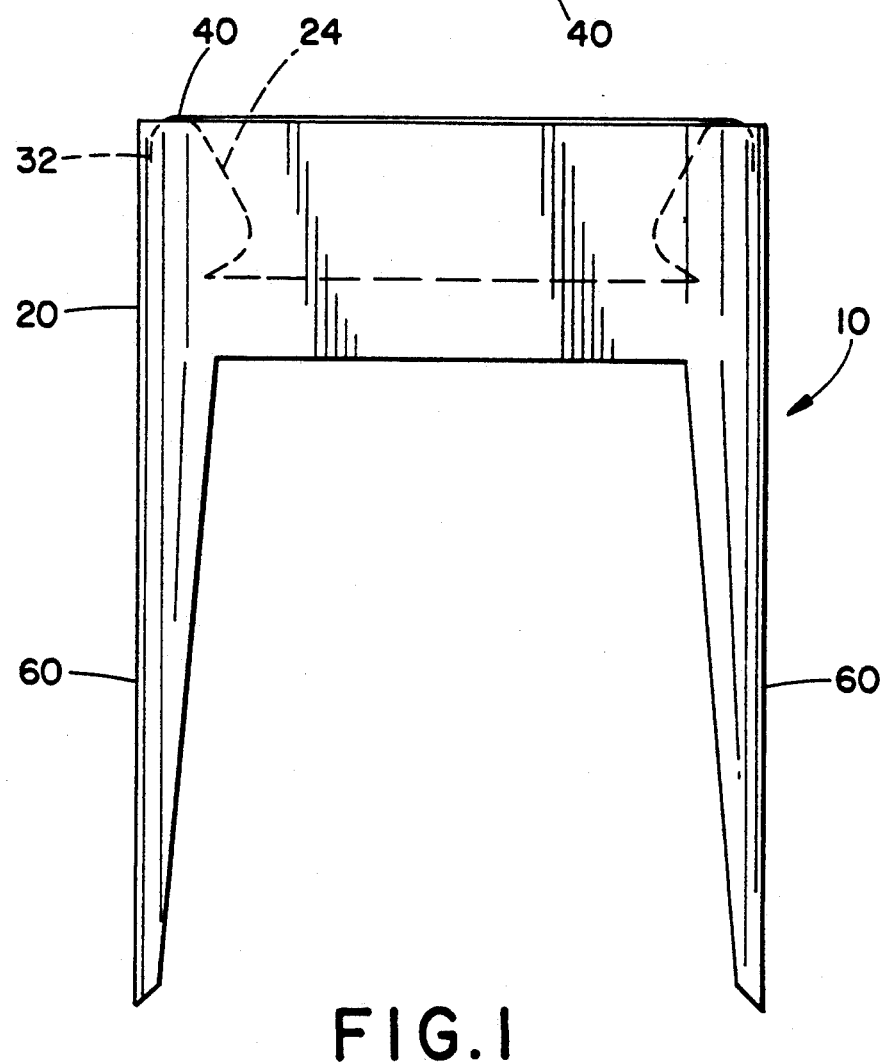
FIG. 1 is an elevational view of a vermin barrier of the present invention.

Referring now to the drawings wherein the showings are for purposes of illustrating the preferred embodiments of the invention only and not for purposes of limiting the same, FIGS. 1 through 3 shown a vermin barrier 10 adapted for use in an above ground or partially below ground telephone cable access housing or pedestal housing.

While the vermin barrier of the present invention can be used in a wide variety of applications including a preferred use along a continuous vertical wall, FIGS. 1-3 show the vermin barrier in connection with an enclosed structure. The structure is a pedestal housing or telephone cable junction box which provides a region for telephone wires to be spliced and company workers to service these spliced cables. The phone cables are represented in phantom as 14, and side walls of the junction box itself are represented in phantom as 16.

The vermin barrier includes a support member 20 and a shield member 24. An exterior surface of the support member 20 is adapted to substantially reflect or parallel the surface of the wall 16. The exterior surface of support member 20 essentially parallels the surface of wall 16 such that the support member is laminarly received adjacent the support member. For example, the wall and exterior surface of support member 20 are shown to be substantially planar and vertical. If the wall were curved, severely angled or otherwise contoured, the exterior surface of the support member would be adapted to meet such contours or any other contours not mentioned herein.

In order to achieve a tight seal between wall 16 and support member 20, a gasket 28 is disposed between the support member and wall. The purpose of the gasket is to prevent any infinitesimally small vermin from crawling behind and bypassing the barrier without an opportunity for stopping the route of travel of that particular pest. The gasket 28 may be treated with a vermin-deterring chemical such as a pesticide.

Shield member 24 is selectively removable from support member 20. The shield member can be fastened or affixed to the support member by a variety of methods including, but not limited to, tongue-in-groove slip joints, hinges, snaps, screws, glue, or, in the alternative, the support and shield member can be one complete, molded, inseparable component. In the preferred embodiment shown in FIG. 3, the shield member is received in the support member according to a slip joint or tongue-in-groove mechanism. An end or tongue 32 of shield member 24 fits securely in a groove 36 defined in support member 20. As can be seen in FIG. 3, the support member increases in thickness to add flange 38 at an area where the groove is defined.

The shield member extends upwardly from the tongue portion 32 to include a curved or crested portion 40 which joins the tongue 32 with a substantially planar guard or block portion 42 extending from the curved portion 40. The block portion 42 is situated such that it is substantially set at an angle diverging from the plane of the support member 20 sufficient to define an interior region 44 therein. This is shown in FIG. 3. In a preferred embodiment, the angle is less than 90°, although it is within the scope of this invention to have an angle at 90° or greater. The guard or block portion 42 of the shield member 24 terminates in a return member 46 which extends from the block member 42 in a direction roughly back toward the support member 20 to further define the interior region 44. It should be noted that the return member 46 extends a length sufficient to further define the interior region, while simultaneously defining an opening 48 between an end of the return and the support member 20 so as to make it inconvenient or impossible for vermin to crawl or jump onto an exterior surface of the shield member such as by stepping onto the exterior surface of the return member. Otherwise, if the opening were too small, the vermin could potentially cross the opening 48 and crawl along an exterior surface of the shield member 24. The interior region would thus be bypassed.

A pesticide is disposed within the interior region. FIG. 3 shows pesticide vehicle mounting means 50, 52 comprising flanges which form U-shaped elements with the support member 20 and the shield member 24 (at the return portion 46), respectively. These mounting means extend from the support and shield members, respectively, to form grooves. The purpose of these flanges 50, 52 is to secure a pesticide-containing vehicle such as a cartridge or reservoir 54 into place along inner walls of the support member and shield member. Although FIG. 3 shows flanges 50 and 52 as forming generally U-defined openings, the members could be comprised of simple tabs, slots or any other means for maintaining a pesticide vehicle in place. Though shown in the figures to be situated near the opening 48, it is within the scope of this invention to have the mounting means situated elsewhere within or without the interior region. For example, the mounting means may be positioned opposite opening 48, deep within the interior region. Alternatively, a reservoir, such as that shown in FIG. 6, may be situated on interior surfaces of the support member 20 and shield member 24 adjacent the inner surface of the curved portion 40.

As is shown in the figures, a pesticide cartridge 54 can be made to extend from the tab 50 adjacent the support member, curve around an inner side of the curved portion 40, and extend along the shield member to terminate at the return 46 and be held by tab 52. The cartridge may be made of biodegradable materials.

Figure 6:
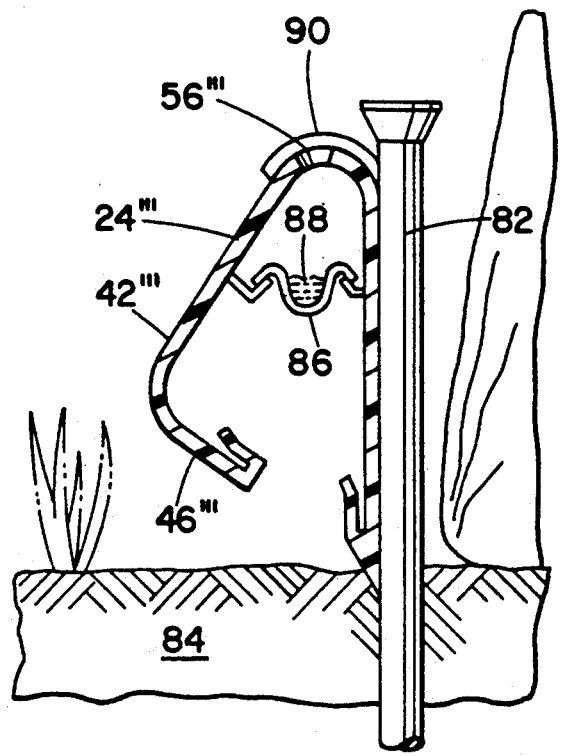
FIG. 6 shows a cross-sectional view of a third alternate embodiment of a vermin barrier.

A crest of the curved portion 40 defines a plurality of openings or weep holes 56 which can be used for reapplication of pesticide to the cartridge or reservoir member 54. Additional pesticide would be fed in through the weep holes 56. Pesticide may also be supplied through the weep hole via a syringe. If a reservoir as shown in FIG. 6 is used (there denoted 86), it is likely that a liquid pesticide would be used and replenished via application by a syringe through weep holes 56. The reservoir would allow the pesticide to diffuse into the interior region to create a vapor head. Provision for a slow drip mechanism may also be used.

It should be noted that the tongue-in-groove mechanism 32, 36 of the vermin barrier provides for ease of installation of pesticide or a pesticide vehicle. One can simply remove the shield member, insert a pesticide cartridge, and then replace the shield member 24.

The pesticide need not be disposed in a cartridge or reservoir. It is fully within the scope of the invention that the pesticide may be applied onto an adhesive-backed material, such as tape, which may be mounted on an interior surface of the interior region to cover a sufficient portion of such inner surface. Although not shown, it is possible that patches of pesticide can be placed randomly on the inner surface or applied by spraying it to the inner surface. Alternatively, the pesticide can be applied by placing it directly on the surface, or by painting the surface with a mixture of paint and pesticide.

The pesticide within the interior region 44 serves to provide for a vermin deterring or vermin killing vapor environment inside said region. The intentionally created vapor head may kill or simply repel, sending the vermin back to where they come from, often back into the ground in the case of telephone cable junction housings. The intentional creation of the vapor head, of course, encompasses a greater area than the interior region 44. It extends through the opening 48 and throughout the interior of the electrical housing to act as a vermin deterrent.

FIG. 1 shows that the vermin barrier 10 has foundation or brace members or legs 60 which maintain the apparatus in secure position. The legs are an extension of support members 20. When used in a housing such as the telephone cable housing described herein, a portion of the legs or support members 60 may be buried in the ground to provide added solid support.

Although FIG. 1 displays the vermin barrier as including a plurality of legs, these legs are simply there to provide support. Other means for support can be used. By way of example, the vermin barrier may be fastened or adhered to a wall such as that of the housing.

The housing unit of the present invention provides for a somewhat square periphery. The plan view of the vermin barrier shown in FIG. 2 clearly sets forth that the vermin barrier is made to be adapted to this roughly square perimeter. If the housing had another shape other than square, including a partially curved or circular configuration, the vermin barrier could be contoured to fit such a shape.

It is not necessary that the vermin barrier be fashioned only to conform to a continuous periphery. It is possible that the vermin barrier be made to extend along a wall or surface of predetermined length and of varying contours including curves, angles and straight lines. Support member 20, shield member 24 and interior region 44 can be made to extend longitudinally along a predetermined or specified length.

Figure 4:
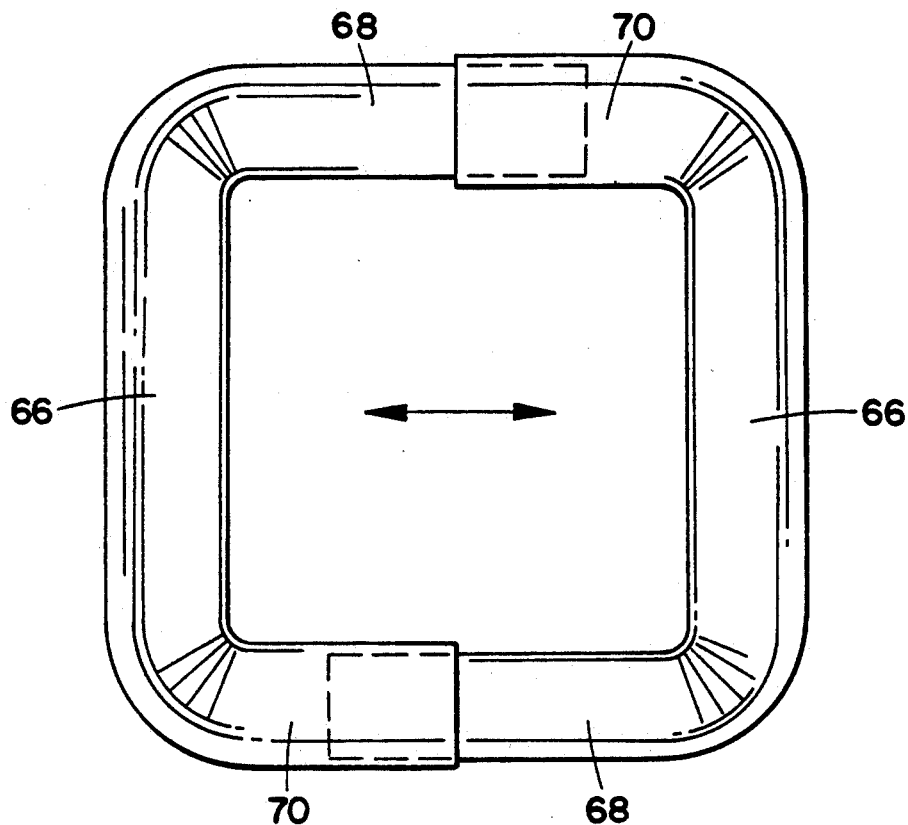
FIG. 4 shows a plan view of a first alternate embodiment of a vermin barrier.

FIG. 4 represents a first alternate embodiment of the vermin barriers. Like elements are designated by like numerals with a single prime ('), and new elements are designated by new numerals.

FIG. 4 represents a plan view of an alternate embodiment vermin barrier 10'. Here, the vermin barrier is shown to be adjustable. While FIG. 4 shows the vermin barrier to be expandable in a single direction, it is fully within the scope herein to show a vermin barrier expandable in other directions. For example, the barrier may be expandable along all its sides. As stated earlier, the vermin barrier can be molded to conform to any contour, and the barrier can likewise be adjustable to better fit any contour.

FIG. 4 shows the adjustable feature of the vermin barrier to comprise telescopic elements. It is foreseeable that the adjustable feature of the vermin barrier may reside in a spring mechanism, elasticized materials, or other means for expansion. It is further foreseeable that the barrier may be comprised of individual units which join together to form indeterminate lengths. The telescopic feature shown in FIG. 4 is merely by way of example.

FIG. 4 discloses two separate substantially U-shaped segments, both designated 66. One arm 68 of the U-shaped segments is longer, while arm 70 is shorter. Arm 68 of one U-shaped segment 66 is telescopically received into arm 70 of the other U-shaped segment to form a rectangular configuration. Segments 66 are shown to be identical for ease of molding or machining. Only a single unit configuration need be produced. Two of these can be positioned in facing relation to one another, as shown in FIG. 4, in order to form a rectangular configuration. It is not necessary that the two members be identical; this is simply shown for manufacturing convenience.

Figure 5:
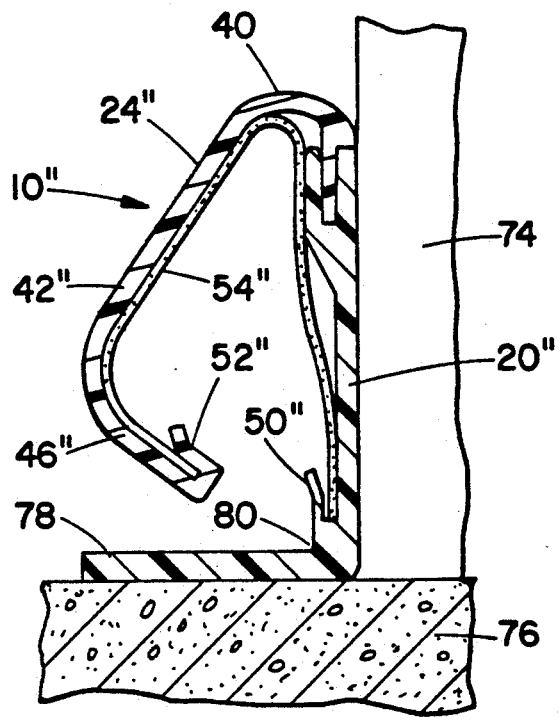
FIG. 5 shows a cross-sectional view of a second alternate embodiment of a vermin barrier.

FIG. 5 represents a second alternate embodiment of the vermin barrier. Like elements are designated by like numerals with a double prime ("), and new elements are designated by new numerals.

FIG. 5 shows a vermin barrier 10" adapted for use along a surface or wall. This embodiment may be used in conjunction with a variety of applications. FIG. 5 represents use of vermin barrier 10" in conjunction with an electrical housing 74 seated on a concrete slab 76. It is desirable to prevent vermin from entering the electrical unit through any vents or openings which may be present thereon. Support member 20" extends down and terminates in a base member 78. The base member is suited for receipt on a horizontal surface such as that shown by slab 76. The vermin barrier shown in FIG. 5 may be set into place by fasteners, adhesive or gravity forces. Either the support or the base member, or both, may be mounted.

It is noted that the base member is shown to be perpendicular to the support member. This angle may be increased or decreased according to the particular application. Eased corner 80 joining the support and base member may be rigidly molded or flexible.

FIG. 6 represents a third alternate embodiment of the vermin barrier. Like elements are designated by like numerals with a triple prime ('''), and new elements are designated by new numerals.

The vermin barrier 10''' of FIG. 6 is suited for use in conjunction with the ground in close proximity to gardens, campsites or non-planar rigid surfaces. An extension member 82 is burrowed into the ground 84 to an indeterminate depth. The extension member may be a continuous elongated structure, or it may be comprised of a series of poles or stakes. Support member 20''' is integral with or otherwise adhered or fastened to the extension member 82. The extension member maintains the barrier in place and is held by the ground. This embodiment shows a reservoir 86 for supplying the pesticide 88. The reservoir may be filled through a weep hole 56''' using perforation defined by the curved portion 40'''. The reservoir may be filled by injecting pesticide through the weep hole or holes using a syringe. The reservoir includes perforations or openings, or is comprised of a pesticide-permeable membrane, such that the pesticide will diffuse into the interior region to create a vermin deterring vapor head therein. The reservoir may be incorporated into the embodiments of FIGS. 1-5. Cap 90 is shown to protect weep holes 56''' from the environment, especially if used outdoors.

The invention has been described with reference to the preferred embodiment. Obviously, modification and alterations will occur to others upon a reading and understanding of the specification. It is intended to include all such modifications and alterations insofar as they come within the scope of the appended claims or the equivalents thereof.

I claim:

1. A vermin barrier, comprising:
a vertically extending support member having a substantially planar exterior surface adapted for receipt adjacent a parallel surface;
a shield member selectively removable from said support member and extending from said support member such that the shield member and the support member together define an interior region, said shield member including a guard member extending at an angle diverging from the plane of said support member sufficient to define the interior region, said guard member terminating in a return member projecting from said guard member in a direction generally back toward said support member to further define said interior region; and
a pesticide disposed within a refillable pesticide-containing vehicle located inside said interior region such that the pesticide diffuses into the interior region and a vapor head is created for deterring vermin from entering said interior region.

2. A vermin barrier, as set forth in claim 1, wherein the shield member is fastened to the support member.

3. A vermin barrier, as set forth in claim 2, wherein said shield member is fastened to said support member according to a tongue-in-groove construction, said support member defining a groove receivable to a flange extending from a connecting end of said shield member.

4. A vermin barrier, comprising:
a vertically extending support member having a substantially planar exterior surface adapted for laminar receipt adjacent a substantially planar parallel surface;
a shield member extending from said support member such that the shield member and the support member together define an interior region, said shield member including a guard member extending at an angle diverging from the plane of said support member sufficient to define the interior region, said guard member terminating in a return member projecting from said guard member in a direction generally back toward said support member to further define said interior region;
a gasket disposed on the exterior surface of the support member to provide a seal between said substantially planar exterior surface and said parallel surface, said parallel surface being a wall, to provide a seal against vermin crawling along said wall; and
a pesticide disposed within a refillable biodegradable pesticide-containing cartridge located inside said interior region such that the pesticide diffuses into the interior region and a vapor head is created for deterring vermin from entering said interior region.

5. A vermin barrier, as set forth in claim 4, wherein said shield member extends from said support member, the shield member extending from a connecting end and terminating in a return member further defining the interior region.

6. A vermin barrier, as set forth in claim 4, wherein said refillable pesticide-containing vehicle is a cartridge or reservoir.

7. A vermin barrier, as set forth in claim 4, wherein said shield member defines a plurality of weep holes to permit receipt of pesticide within said interior region.

8. A vermin barrier, as set forth in claim 4, wherein said support member, said shield member and said interior region together extend along a predetermined length.

9. A vermin barrier, as set forth in claim 4, wherein a portion of said support member extends downward to provide a base for said barrier.

10. A vermin barrier, as set forth in claim 4, wherein a portion of said support member provides a means for fastening the vermin barrier to the substantially parallel surface.

11. A vermin barrier, as set forth in claim 4, wherein a portion of said support member provides independent support for said barrier.

12. A vermin barrier, as set forth in claim 4, wherein the vapor head is intentionally created within said interior region.

13. A vermin barrier, as set forth in claim 4, wherein said return member and said support member define an opening for impeding vermin from moving onto an exterior surface of the shield member, said opening narrower than a portion of the interior region.

14. A vermin barrier suited for receipt within an enclosed region having a perimeter defined by a substantially continuous wall, said vermin barrier comprising:
a substantially continuous support member adapted for laminar receipt adjacent said substantially continuous wall;
a substantially continuous shield member selectively removable from said support member, said shield member extending from an upper end of said support member such that a substantially continuous interior region is defined; and
a pesticide disposed within a refillable vehicle situated at least partially inside said interior region for intentionally creating a vermin deterring vapor head within said interior region.

15. A vermin barrier suited for receipt within an enclosed region having a perimeter defined by a substantially continuous wall, said vermin barrier comprising:
a substantially continuous support member adapted for laminar receipt adjacent said substantially continuous wall such that said support member extends along the perimeter defined by said substantially continuous wall;
a gasket on an exterior surface of said support member to provide a tight seal between said support member and said substantially continuous wall;
a substantially continuous shield member extending from an upper end of said support member such that a substantially continuous interior region is defined about said perimeter; and
a pesticide disposed within a refillable vehicle situated at least partially inside said interior region for intentionally creating a vermin deterring vapor head within said interior region and said enclosed region.

16. A vermin barrier as set forth in claim 15, wherein said shield member extends from the upper end of said support member, terminating in a substantially continuous return member further defining said interior region.

17. A vermin barrier, as set forth in claim 15, wherein said shield member is integrally molded with said support member.

18. A vermin barrier, as set forth in claim 15, wherein the refillable vehicle comprises a selectively removable cartridge or reservoir.

19. A vermin barrier, as set forth in claim 18, wherein said selectively removable cartridge or reservoir is disposed along an interior surface of said shield member.

20. A vermin barrier, as set forth in claim 15, wherein means for mounting the pesticide vehicle extends from an inner wall defining the interior region.

21. A vermin barrier, as set forth in claim 15 wherein said enclosed region is a telephone pedestal.

22. A vermin barrier suited for receipt along a wall, said vermin barrier comprising:
   a support member adapted for receipt adjacent said wall;
   a selectively removable shield member extending from an upper segment of said support member at an angle sufficient to define an interior region between said support member and said shield member;
   a pesticide vehicle disposed within said interior region; and
   a pesticide retained in said pesticide vehicle for creating a vermin deterring environment.

23. A vermin barrier suited for receipt along a wall, as set forth in claim 22, wherein said vermin deterring environment is created by purposeful formation of a vapor head within said interior region by diffusion of pesticide into the interior region.

24. A vermin barrier, comprising:
   a substantially continuous support member having an exterior surface which is adapted for laminar receipt adjacent a substantially continuous wall;
   a substantially continuous shield member extending from an upper end of said support member such that a substantially continuous interior region is defined; and
   a pesticide disposed within said interior region for intentionally creating a vapor head within said interior region, wherein a selectively removable cartridge or reservoir is disposed in said interior region as a vehicle for the pesticide, a plurality of weepholes being defined in said shield member closely adjacent said support member for addition of pesticide to said cartridge or reservoir.

* * * * *